Figure 1:
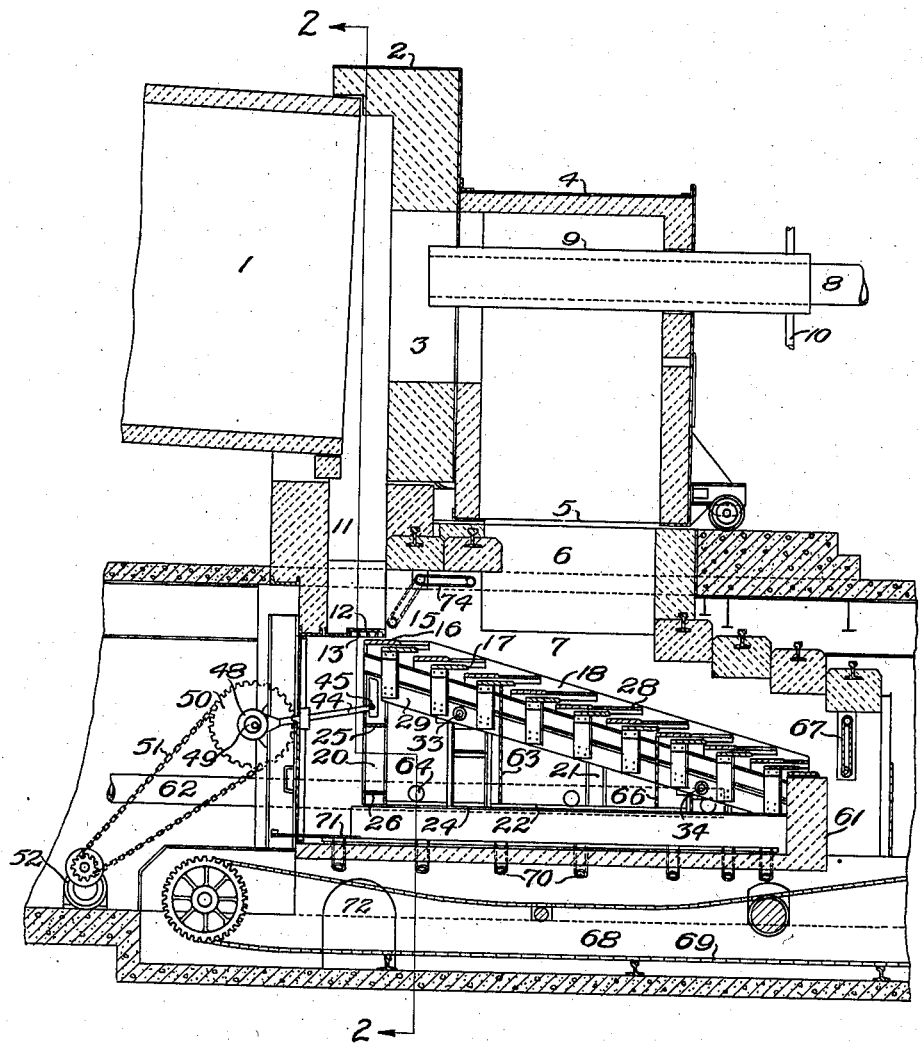

Nov. 15, 1938.　　　A. E. DOUGLASS　　　2,137,158
CLINKER COOLING
Filed Dec. 1, 1937.　　　4 Sheets-Sheet 1

INVENTOR
ALFRED E. DOUGLASS
BY
ATTORNEYS

Nov. 15, 1938.  A. E. DOUGLASS  2,137,158
CLINKER COOLING
Filed Dec. 1, 1937   4 Sheets-Sheet 2

INVENTOR
ALFRED E. DOUGLASS
BY
ATTORNEYS

Nov. 15, 1938.  A. E. DOUGLASS  2,137,158
CLINKER COOLING
Filed Dec. 1, 1937  4 Sheets-Sheet 3

INVENTOR
ALFRED E. DOUGLASS
BY
ATTORNEY

Patented Nov. 15, 1938

2,137,158

UNITED STATES PATENT OFFICE 2,137,158

CLINKER COOLING

Alfred E. Douglass, Catasauqua, Pa., assignor to Fuller Company, Catasauqua, Pa., a corporation of Delaware Application December 1, 1937, Serial No. 177,634

20 Claims. (Cl. 263—32)

This invention relates to clinker cooling and more particularly to the rapid air quenching of Portland cement clinker. It has especially to do with the cooling of cement clinker containing a proportion of magnesium oxide at a rate sufficiently rapid to cause at least a substantial proportion of the liquid phase to solidify without crystallization, as an under-cooled liquid or "glass" in which the magnesia is present in solid solution, and thereby rendered innocuous.

The present apparatus can be operated to carry out the practice of the method of production and cooling of cement clinker described and claimed in my copending application, Serial No. 218,228, filed July 8, 1938.

Delayed expansion or unsoundness of Portland cement concrete, attributable to high magnesia content and resulting in disintegration in concrete structures, has been determined to be directly related to the proportion of free magnesia in the crystalline form, periclase. The rate of hydration of periclase is extremely slow and investigations have indicated that complete hydration and substantial disintegration may be delayed for periods up to above five years. An accelerated test for the determination of unsoundness of Portland cement is now available in a new autoclave technique, and definite references herein to percentage of expansion refer to autoclave test specimens. It has been decided by the cement industry that cements expanding more than 1% are unsound. The phrase "high magnesia content", as used herein, includes cements in which the proportion of magnesium oxide ranges from a minimum of about 3% to the maximum permitted by cement specifications, namely 5%, although cements of slightly greater magnesia content are not necessarily unsound if the magnesia is not permitted to crystallize, as will appear more fully hereinafter.

The liquid phase of the clinker at the burning temperature, usually 2600° to 2700° F., is believed to comprise all of the alumina and iron oxide, the magnesium oxide, a small proportion of the calcium oxide and a slight amount of silica. Little, if any, of the magnesium oxide reacts, in the normal range of cement clinker, with the other compounds present, although possibly a negligible proportion combines with or is otherwise held within the iron compounds. The quantity of the liquid is therefore related to the proportion of the fluxing compounds, iron and alumina, in the mixture. The theoretical proportion of liquid, in clinkers of usual commercial compositions, accordingly approaches a maximum of about 30%. Crystallization of the liquid is completed when the temperature of the clinker drops to about 2200° F., no apparent increase in crystallization occurring below this temperature. The extent of crystallization is directly related to the rate of temperature drop. If the liquid is cooled slowly or at a moderate rate, the principal compounds that crystallize out of solution are tricalcium aluminate, and tetracalcium alumino ferrite, and lastly periclase (free MgO). Of these crystalline compounds, periclase is definitely harmful as it is the principal contributor to delayed unsoundness. If the liquid containing the dissolved magnesium oxide is cooled abruptly, the magnesium oxide held in the proportion of liquid which solidifies as glass in relatively large concentration at least, and has little, if any, hydraulic characteristics, and, accordingly, no apparent tendency to produce unsoundness. It is probable that the formation of a relatively large proportion of glass is beneficial for other reasons, as experimental evidence indicates that the glass itself has very limited, if any, hydraulic properties and by thus limiting the proportion of (crystalline) tricalcium aluminate its possible effect upon soundness is limited and, in addition, the potential heat of hydration of the cement is reduced. If the clinker contains a substantial proportion of alumina, limiting the formation or crystallization of tricalcium aluminate results in a cement more easily controlled as to setting time. Further, some authorities believe that relatively large proportions of the crystalline compound tetracalcium alumino ferrite reduce the resistance of Portland cement concrete to attack by sulphates and chlorides, and to freezing and thawing.

The immense practical difficulties involved in air quenching or otherwise cooling the clinker make it impractical, if not impossible, to attain the maximum theoretical glass content, in view of the conditions under which the clinker is burned, the high temperatures necessary, the wide range of clinker particle sizes and the narrow range of temperature drop within which crystallization takes place. The production of about 20 to 25% of glass, in high magnesia clinkers of the types described, is highly satisfactory with reference to magnesia unsoundness because the magnesia is the last to crystallize and necessarily tends to concentrate in any substantial proportion of the liquid which solidifies as glass, and, if the cement is otherwise properly prepared, the autoclave expansion will not exceed a small fraction of one percent.

Recent commercial cement clinkers have been found to have a range of glass contents from 2 to 22%, this extreme variation being due to the wide variety of burning and cooling methods and apparatus used. Modern clinker coolers are especially designed for two principal purposes, first, to recuperate a substantial proportion of the sensible heat of the clinker, the heated air usually being employed as a secondary combustion air in the kiln and, second, to cool the clinker quickly to a temperature slightly above atmospheric to improve the grinding characteristics. These coolers and methods are especially unsatisfactory for high magnesia clinkers for, although the overall cooling rate is "quick" and satisfactory efficiencies in recuperation are obtained, cooling in the range of maximum temperatures, in which crystallization takes place, is delayed, with the result that crystallization of the liquid phase is promoted, the most efficient recuperators usually producing clinkers of minimum glass contents.

It is accordingly the principal purpose of the invention to air quench the clinker rapidly to cause the temperature to fall below 2200° F. in a minimum of time, so that a large proportion of glass will be formed, or, conversely, the crystallization from the liquid will approach the practical minimum. It is a further purpose to utilize the secondary combustion air, under full control to satisfy various burning conditions, to effect the initial air quenching and additional primary cooling, not merely to effect economies in heat recovery, but principally to move the burning zone to or near the end of the kiln, so that the clinker will be discharged in its partly molten state and delayed cooling in the crystallization temperature range will not occur in the kiln itself. The complete invention also contemplates the quick primary and secondary cooling of the clinker, or overall cooling, to give the clinker satisfactory grinding characteristics.

The cooling apparatus is especially designed with the object of avoiding kiln stoppages, or substantial unbalance of the burning conditions, with the consequent increase in operating costs and the adverse effect upon the quality of the cement. The apparatus has accordingly been so designed that the principal cooling elements may be by-passed and made almost instantly available for repair or replacement, and without seriously affecting essential production operations. It is also among the purposes to provide an inexpensive, readily accessible apparatus, requiring no special heat-resisting metals, and which can be operated economically, with reference both to maintenance requirements and power consumption.

In general, the invention comprises moving the burning zone to or near the discharge end of the kiln, by providing a heat radiating surface in the form of a refractory-lined hood having a central opening, through which the fuel and primary air enters entirely surrounded by highly preheated secondary combustion air. The central location of the air stream avoids premature chilling and slow cooling of the clinker, which discharges in a partly molten state and falls through a chute, designed to prevent air counterflow, the clinker passing directly to a primary cooling chamber wherein it forms an inclined bed resting upon the cooling elements. The principal cooling elements comprise a series of overlapping, horizontal water-cooled grates. Fixed grates alternate with movable or reciprocating grates, the latter serving to agitate the bed continuously and to cause individual particles to be rolled or overturned as they are advanced toward the discharge port at the lower end of the grate assembly. The slope formed by the leading edges of the grates is preferably relatively flat so that incoming clinker particles will not roll downwardly over the upper surface of the bed, a slope of about 12° having been found to be satisfactory for clinker of normal type. Each grate is provided with a multiplicity of vertical air ports, alternately covered and uncovered, as the moving grates are advanced and retracted, through which air under pressure is forced upwardly through the clinker bed. The fixed and moving grates are also vertically spaced, usually about one-quarter inch, to provide a horizontal air passage through which air is forced continuously at substantially right angles to the flow through the ports and generally in the direction of the advancing clinker.

Immediately upon dropping through the chute and entering the cooling chamber, the clinker particles are subjected to blasts of cold air, and as they are continuously agitated and overturned as they are advanced from grate to grate the cold air blasts impinging upon the particles from two directions, together with the heat transfer to the grate cooling water, provides for abrupt and uniform cooling.

The space in the cooling chamber below the grates forms a wind-box supplied by a fan having the capacity to deliver a volume flow of air at least equal to the kiln requirement of secondary air for combustion against the pressure necessary to overcome the resistance of the cooling elements and the clinker bed, the downstream pressure not usually exceeding 5 inches of water. The wind-box is preferably provided with transverse baffles to form compartments separately supplied with air under control of volume flow, so that the necessary volume can be forced through and between the grates at and adjacent to the entrance to the chamber to reduce abruptly the temperature of the clinker at least to 2200° F. Although the diversion of a relatively large proportion of the air flow through the rearward elements of the grate surfaces, to satisfy a severe magnesia condition may be, at times, less efficient in heat recuperation than modern types of coolers, it should be borne in mind that the principal objective is to produce a maximum glass content and that even moderate delay in cooling in the region of high temperature results in the formation of dangerous proportions of periclase.

The rest of the requirement of secondary air is preferably proportioned and distributed through the remainder of the clinker bed to provide for a maximum heat recovery with relation to the permissible volume of air. The preheated secondary air passes freely upward to a bustle above the chamber, from which it enters the kiln, as previously described.

In addition to the control of cooling rates, in succeeding portions of the clinker bed by the above described proportioning of volume flow of air, the degree of agitation may be modified by adjusting the "throw" or extent of movement of the moving grates and the rate of travel of the bed, i. e. the time of exposure in the cooling chamber, may be modified by changing the rate of movement of the grates.

The clinker, as discharged from the forward elements of the grate assembly, has been subjected to "primary" cooling only, and "secondary" cooling is desirable for reasons well understood in the art. Secondary cooling is preferably accomplished by providing a second chamber and grate assembly, beyond and generally similar to that above described, or a rotary or other cooler of conventional type may be employed. However, overall cooking may be accomplished by a single apparatus and, to that end, the length of the grate assembly and cooling chamber is increased and the latter is divided by a hanging wall or suspended arch to provide primary and secondary cooling chambers. The air supplied to the secondary cooling chamber is separately exhausted, and a balanced pressure condition is established to prevent flow of air from either chamber to the other, especially to prevent an excessive flow, i. e. greater than the combustion requirements, to the bustle and to avoid reducing the temperature of the secondary combustion air. This may conveniently be accomplished by providing an adjustable damper in the exhaust flue or stack.

Figure 2:
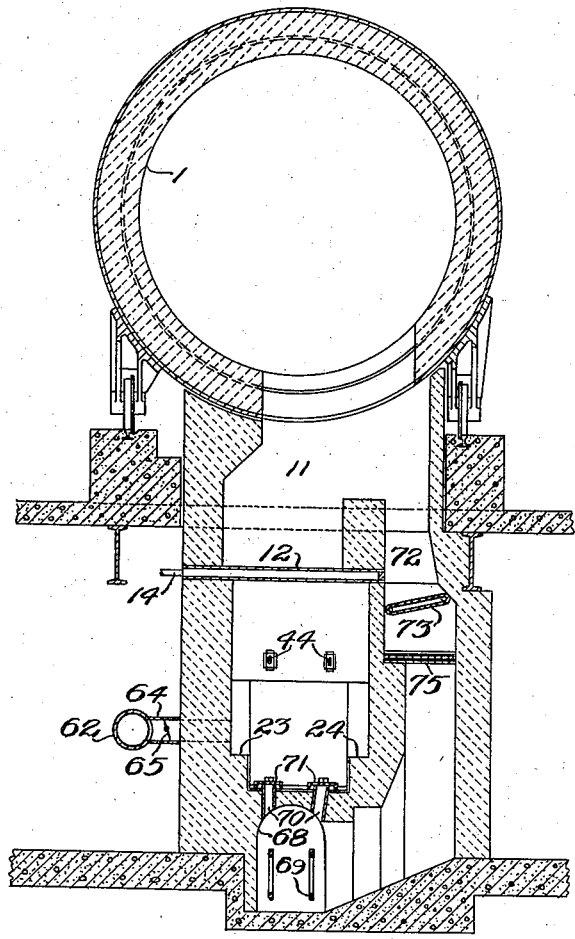
Figure 3:
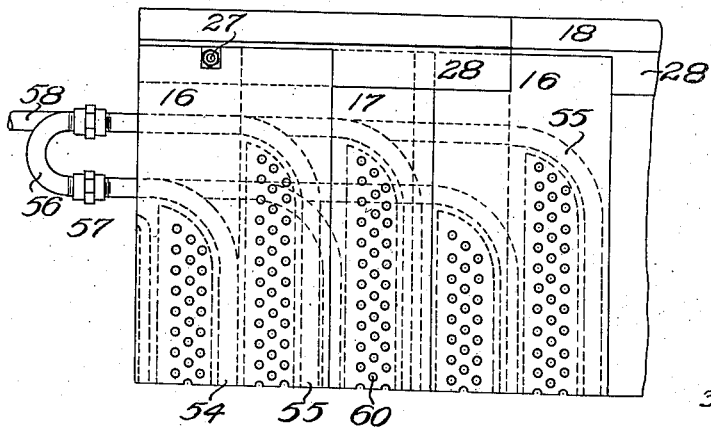
Figure 5:
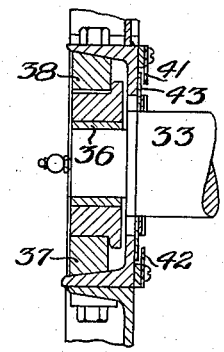
Figure 4:
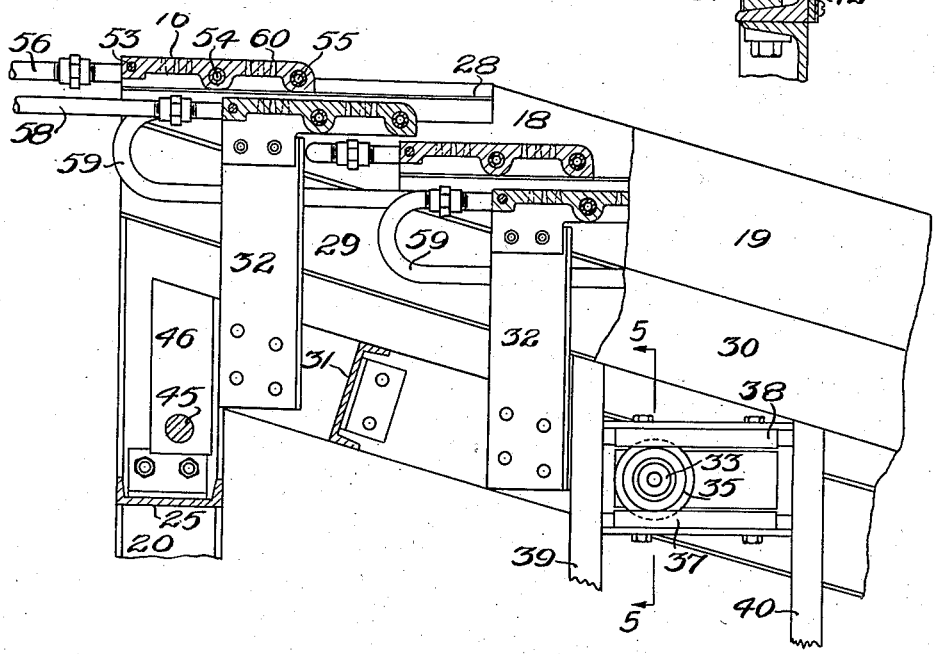
Figure 6:
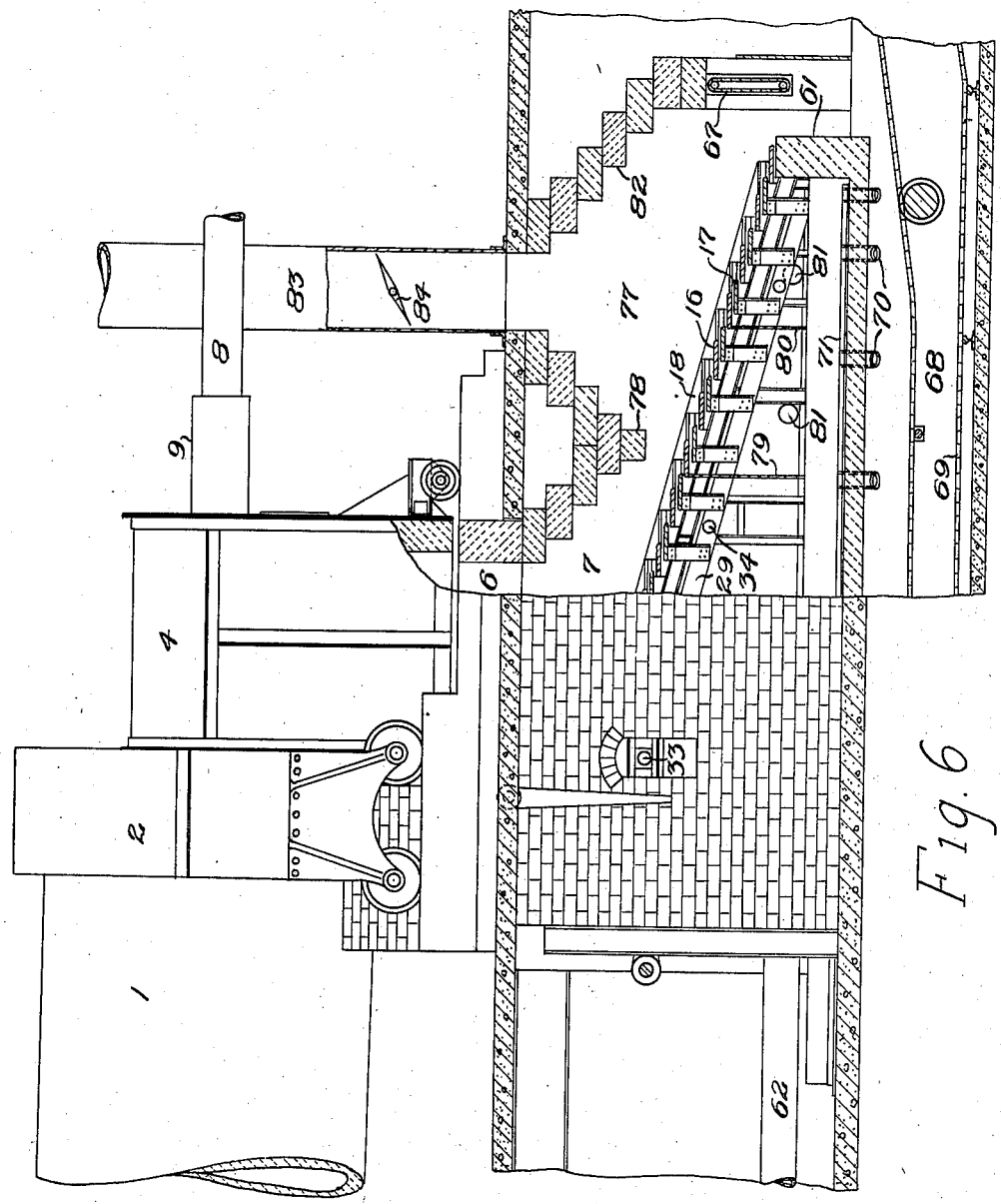

For a better understanding of the invention, reference is made to the accompanying drawings, in which Fig. 1 is a sectional elevation of the apparatus for primary cooling, Fig. 2 is a cross-sectional elevation on line 2—2 of Fig. 1, Fig. 3 is a fragmentary plan view of the rearward portion of the grate assembly, Fig. 4 is a fragmentary elevation partly in section, of the rearward portion of the grate assembly, Fig. 5 is a cross-sectional detail of one of the supporting wheels for the moving grate, on line 5—5 of Fig. 4, and Fig. 6 is an elevation, partly in section of a modified form of the apparatus in which a single grate assembly is employed to effect both primary and secondary cooling.

Referring to the drawings, and first to Fig. 1, a rotary kiln 1, of conventional type, is shown to be closed and sealed by a refractory-lined hood 2, the hood being provided with a relatively large circular opening 3 communicating with the upper portion of an arch-shaped, refractory-lined bustle 4, the bustle being longer than usual and having an open bottom 5, which registers with a passage 6 opening into the cooling chamber 7. The kiln is shown to be fired by pulverized coal, as this fuel presents the greatest difficulty in avoiding delayed cooling and is more commonly used than oil or gas. The coal, suspended in the primary air stream, enters the kiln through the fuel pipe 8, the portion of the pipe within the bustle 4 and the opening 3 of the hood being protected by a water-jacket 9 supplied with cooling water through a suitable connection indicated at 10. The fuel stream enters the kiln entirely surrounded by highly pre-heated secondary air and this, together with the retracted position of the ends of the fuel pipe and heat radiation from the refractory surfaces of the hood, causes rapid combustion and advances the burning zone or region of highest temperature toward the discharge end of the kiln, whereby the clinker is discharged before substantial crystallization from the liquid phase takes place. It will also be seen that the location of the circular opening 3 is such that its walls prevent impingement of the relatively cool secondary air stream upon the hot clinker, thereby preventing freezing of the liquid in the kiln itself.

The partly molten clinker falls through a narrow clinker chute 11, the chute being displaced transversely toward the "rising side" of the kiln, as shown more clearly in Fig. 2, the dimensions and location of the chute preventing a counterflow of air through the descending clinker. The bottom of the chute is closed by a water-cooled shelf 12, provided with suitable baffles 13 for guiding the circulation of water supplied through the connection 14. After the clinker particles have accumulated upon the shelf 12, and have formed a natural angle of repose, the descending clinker particles are distributed by the pile thus formed and pass through the entrance 15 of the cooling chamber 7, in which they form as an inclined bed resting upon the grate assembly about to be described.

Referring to Figs. 1, 3 and 4, it will be seen that all of the fixed grates 16 are rigidly secured to a stationary frame, and all of the moving grates 17 are similarly secured to a moving frame, forming separate, unitary structures. The stationary frame comprises inclined channel members 18 and 19, secured by upright supports, as at 20 and 21, to lower horizontal frame members 22 which rest upon the ledges 23 and 24, shown in Fig. 2, suitable transverse braces being provided as at 25 and 26. The fixed grates 16 are bolted, as at 27 to angular brackets 28, welded or otherwise secured to the frame members 18 and 19, each bracket extending forwardly beyond the fixed grate to deflect the clinker particles from the space between the side edges of the moving grates 17 and the frame members 18 and 19.

The moving frame comprises inclined side members 29 and 30, suitably braced as at 31, the side members carrying uprights 32 to which flanges, cast integrally at the side edges of the moving grates 17, are secured. The members 29 are secured to axles 33 and 34, supported by flanged wheels 35, shown in detail in Fig. 5, provided with bronze bushings 36, the wheels turning on the axles and running on rails 37 and guided by upper rails 38, the rails being bolted to angle members secured to and supported by uprights of the stationary frame, as at 39 and 40. Fixed plates 41 and 42 cooperate with a plate 43 secured to each axle to seal the apparatus against an outward flow of air past the wheels, as will appear more fully hereinafter.

The desired reciprocating motion of the movable frame may be conveniently accomplished by two spaced eccentrics of conventional type comprising eccentric rods 44 pivotally connected to a horizontal shaft 45 secured to brackets 46 on the movable frame members, the rods passing through slots in the rear wall of the chamber 7 and terminating in the usual straps 48 surrounding each eccentric disc 49. A common crank shaft is provided with a sprocket 50 driven through a chain 51 by a variable speed motor, with speed reducer, indicated at 52. It will be seen that the grates 17 move in a horizontal plane between the fixed grates 16 and that the extent of movement or throw depends upon the eccentricity of the discs 49 on the crank-shaft. In Fig. 5, the moving grates are shown to be in their rearmost position and the maximum permissible advance is about one-half their width, at which point the rear edge of each moving grate is covered by the leading edge of the fixed grate above it, thereby avoiding passage of fine clinker between the grates. It will also be understood that the rate of travel of the bed, and consequently its thickness can be varied by changing the speed of the motor 52.

As shown in detail in Figs. 3 and 4, the fixed and moving grates are essentially similar, and may be gray iron castings, the forward or leading edges of the fixed grates and the forward and side edges of the moving grates preferably being chilled in casting to resist the wear of the highly abrasive clinker. The rear edge of each grate is reinforced by a steel rod 53 and water-cooling tubes 54 and 55 are imbedded in the casting and are thoroughly bonded as integral parts thereof. These tubes may be tinned or galvanized iron water pipes and are curved and spaced as indicated in Fig. 3 so that the entire surface of the grate is effectively cooled for the dual purposes of cooling the clinker and making it unnecessary to employ heat resisting alloys. The ends of the tubes of each fixed grate are coupled by U-bends 56 and unions 57, the moving grates being provided with similar bends but on the opposite side. Cooling water is supplied through a suitable flexible connection, such as a flexible hose, not shown, to the pipe 58 and passes through the upper moving grate 17 and then downwardly to the next lower moving grate through the vertical U-bend 59, single circuits of cooling water being thus supplied separately to the fixed and moving grates.

Each of the grates is provided with a multiplicity of vertical ports or orifices 60, the orifices being conical and widening downwardly so that they will not be plugged by small particles of clinker when the apparatus is idle and the air supply is stopped. The alternate grates are spaced a distance, usually about ¼", to form horizontal air passageways from the lower portion of the chamber 7, which forms the wind-box. The forward or discharge end of the cooling chamber 7 is closed below the grate assembly by a refractory wall 61 upon which the lowermost fixed grate rests. The ancillary or secondary combustion air is the principal cooling medium and is supplied to the wind-box portion of the chamber 7 through a duct 62 supplied by the usual fan, not shown, the pressure being sufficient to overcome the resistance to flow presented by the grate and the thickness and density of the clinker bed. The volume of the air so supplied is limited to the combustion requirements of the kiln together with any additional quantity necessary to compensate for leakage. The wind-box is preferably provided with at least one transverse baffle 63 to form a compartment supplied by the duct 62 through one of the connections 64 which is provided with a damper 65 whereby the necessary volume of air can be diverted through and between the grates adjacent to the entrance 15 of the chamber 7, to provide the abrupt chilling previously described. Preferably at least one additional baffle, as indicated at 66, divides the wind-box into additional compartments, whereby the volume flow of air through the remainder of the clinker bed may be proportioned to provide for a maximum of cooling and heat recuperation.

The clinker discharging over the lowermost fixed grate falls between the wall 61 and a pivotally supported water-cooled gate or screen 67, the clinker falling to a tunnel 68 from which it may conveniently be conveyed by a drag-chain 69 of conventional type. The tunnel 68 is provided with spaced passages 70 for the discharge of fine clinker particles and dust which accumulate in the wind-box, particularly when the apparatus is idle, the passages 70 normally being closed by slide-gates 71.

By reference to Fig. 2, it will be seen that a clinker by-pass chute 72 is provided through which the clinker may be diverted in the event of damage or other accidental stoppage of the above described cooling mechanism. This chute is normally closed by a pivoted water-cooled gate 73. To divert the clinker through the chute 72, the gate 74, shown in Fig. 1, is swung to the dotted line position, closing the entrance 15 to the cooling chamber, the gate 73 is swung to a vertical position and the clinker falls to the upper surfaces of at least three spaced and partially overlapping plates 75, the lower plates being echeloned forwardly to form an incline from which the clinker is blown by air under fan pressure entering the chute between the plates. From the plates, the clinker descends by gravity and is removed by the drag-chain 69. This arrangement provides for the essential abrupt chilling of the clinker and avoids interruption of the kiln operation.

The operation of the apparatus will be generally apparent from the foregoing, and it will be understood that a relatively flat, inclined clinker bed forms on the grate surfaces and is moved toward the forward or discharge end of the cooling chamber at a regular, intermittent rate. The thickness of the bed, normally from 3 to 6 inches, and the rate of travel are controlled by the rate of reciprocation, the discs 49 of the eccentrics usually being driven at a speed of from 4 to 6 R. P. M. in an apparatus of the proportions illustrated. The individual clinker particles are subjected to continuous agitation and rolling movements as they descend from grate to grate and are alternatively and successively subjected to air blasts from two directions. As the moving grates are advanced and retracted, the orifices 60 in the rear half of each grate, excepting the first and last, are alternately covered and uncovered. During the rearward movement, the leading edges of the fixed grates force the clinker particles to descend to the next lower fixed grate, from which they are forced during the forward movement, and it will be realized that the locations of the horizontal air blasts change continuously. This treatment of the clinker accordingly provides for abrupt and uniform chilling.

In the practical operation of the above described apparatus, in the cooling of high magnesia clinker, of 4.4% MgO, high theoretical tricalcium aluminate and low iron, the autoclave specimens averaged 0.25%, with expansions down to 0.15% under favorable conditions, whereas the same kiln when equipped with an integral cooler of conventional type, produced satisfactory, hard burned clinker of equivalent chemical composition, but autoclave expansions were prohibitive, ranging between 2.0 and 4.0%, with average specimens expanding 2.5%.

The modified form of apparatus illustrated in Fig. 6, is designed to effect both primary and secondary cooling of the clinker, i. e. in addition to each of the purposes above described, to reduce the temperature of the clinker quickly to improve its grinding characteristics. Thus, the permissible volume of air that may efficiently be employed in the primary cooler, illustrated in Fig. 1, is limited to the combustion requirements of the kiln and the clinker discharged therefrom will still range in temperature from about 800° to 1000° F.

In this form, the principal changes have to do with a cooling chamber and grate assembly of considerably increased length, with means to exhaust and control the additional air quantity required for secondary cooling. The same reference characters are applied, where appropriate, and the modified and additional parts are shown in section. The primary cooling chamber 7 is separated from the secondary cooling chamber 77 by a hanging or suspended wall 78, sufficient clearance above the grates being provided to permit large lumps of clinker to pass. Below, and preferably slightly to the rear of the wall 78, the wind-box is divided by an additional baffle 79, forming the principal division wall to separate the secondary combustion air from the waste air employed for secondary cooling. Distribution of the additional air may further be controlled by one or more baffles 80, to provide separate compartments supplied by connections 81 opening into the duct 62, under control of dampers 65, as illustrated in Fig. 2.

The slopes of the hanging wall 78 and the suspended arch 82 permit the additional air, after effecting the desired secondary cooling, to ascend freely to an exhaust flue or stack 83, through which the flow is controlled by an adjustable damper 84, the damper serving as a convenient means to establish a balanced pressure condition between the primary cooling chamber 7 and the secondary cooling chamber 77, to prevent air flow from one chamber to another. Variation in the kiln flue gas analysis and temperature variations in the ascending air streams are sufficiently accurate indices of unbalanced pressure conditions for practical purposes.

I claim:

1. In an apparatus for the rapid cooling of cement clinker, the combination of a cooling chamber having an entrance for hot clinker at one end and a discharge port at the other, cooling elements in the chamber comprising a series of spaced over-lapping grates, fixed grates alternating with movable grates, the upper surfaces of the grates serving to support a bed of clinker particles, means to impart reciprocating movement to the movable grates, to agitate and advance the bed, and means to admit air under pressure to the chamber below the grates to provide air blasts flowing between the grates and into the clinker in the general direction of the movement of the bed.

2. In an apparatus for the rapid cooling of cement clinker, the combination of a cooling chamber having an entrance for hot clinker at one end and a discharge port at the other, cooling elements in the chamber comprising a series of over-lapping grates, fixed grates alternating with movable grates, the upper surfaces of the grates serving to support a bed of clinker particles, means to impart reciprocating movement to the movable grates, to agitate and advance the bed, the grates being provided with orifices for the upward flow of air, and means to admit air under pressure to the chamber below the grates to provide air blasts flowing upwardly through the orifices and through the clinker particles.

3. In an apparatus for the rapid cooling of cement clinker, the combination of a cooling chamber having an entrance for hot clinker at one end and a discharge port at the other, cooling elements in the chamber comprising a series of horizontal, slightly vertically spaced, over-lapping grates, fixed grates alternating with movable grates, the upper surfaces of the grates serving to support a bed of clinker particles, means to impart reciprocating movement to the movable grates, to agitate and advance the bed, and means to admit air under pressure to the chamber below the grates to provide air blasts flowing between the grates and into the clinker in the general direction of the movement of the bed.

4. In an apparatus for the rapid cooling of cement clinker, the combination of a cooling chamber having an entrance for hot clinker at one end and a discharge port at the other, cooling elements in the chamber comprising a series of horizontal, slightly vertically spaced, over-lapping grates, fixed grates alternating with movable grates, the upper surfaces of the grates serving to support a bed of clinker particles, means to impart reciprocating movement to the movable grates, to agitate and advance the bed, the grates being provided with orifices for the upward flow of air, and means to admit air under pressure to the chamber to provide blasts flowing both between the grates and through the orifices into the clinker.

5. In an apparatus for the rapid cooling of cement clinker, the combination of a cooling chamber having an entrance for hot clinker at one end and a discharge port at the other, cooling elements in the chamber comprising a series of spaced over-lapping grates, fixed grates alternating with movable grates, the upper surfaces of the grates serving to support a bed of clinker particles, means to impart reciprocating movement to the movable grates, to agitate and advance the bed, means to admit air under pressure to the chamber below the grates to provide air blasts flowing between the grates and into the clinker in the general direction of its movement, and means to divide the flow of air and control the quantities flowing into at least two portions of the bed.

6. In an apparatus for the rapid cooling of cement clinker, the combination of a cooling chamber having an entrance for hot clinker at one end and a discharge port at the other, cooling elements in the chamber comprising a series of spaced over-lapping grates, fixed grates alternating with movable grates, the upper surfaces of the grates serving to support a bed of clinker particles, means to impart reciprocating movement to the movable grates, to agitate and advance the bed, at least one transverse baffle in the chamber below the grates to provide compartments, and means to admit air under pressure to the compartments.

7. In an apparatus for the rapid cooling of cement clinker, the combination of a cooling chamber having an entrance for hot clinker at one end and a discharge port at the other, cooling elements in the chamber comprising a series of horizontal, slightly vertically spaced, overlapping, water-cooled grates, fixed grates alternating with movable grates, the upper surfaces of the grates serving to support a bed of clinker particles, means to impart reciprocating movement to the movable grates, to agitate and advance the bed, and means to admit air under pressure to the chamber below the grates and into the clinker in the general direction of the movement of the bed.

8. In an apparatus for the rapid cooling of cement clinker, the combination of a cooling chamber having an entrance for hot clinker at one end and a discharge port at the other, cooling elements in the chamber comprising a series of slightly vertically spaced horizontal overlapping grates, fixed grates alternating with movable grates, the upper surfaces of the grates serving to support a bed of clinker particles, the fixed grates being secured to inclined side members of a stationary frame, the movable grates being secured to and supported above a movable frame below the stationary frame, means to impart reciprocating movement to the movable frame, to agitate the clinker bed and to cause it to advance intermittently and regularly, and means to admit air to the chamber below the grates to provide air blasts flowing through the spaces between the grates and into the bed in the general direction of its movement.

9. In an apparatus for the rapid cooling of cement clinker, the combination of a cooling chamber having an entrance for hot clinker at one end and a discharge port at the other, cooling elements in the chamber comprising a series of slightly vertically spaced, horizontal, overlapping grates, fixed grates alternating with movable grates, the upper surfaces of the grates serving to support a bed of clinker particles, the fixed grates being secured to inclined side members of a stationary frame, the movable grates being secured to and supported above a movable frame below and surrounded by the stationary frame, the movable frame being supported upon axles provided with wheels supported upon horizontal rails secured to the stationary frame, means to impart reciprocating movement to the movable frame, to agitate the bed and advance it intermittently and regularly, and means to admit air under pressure to the chamber below the grates to provide air blasts flowing through the spaces between the grates and into the bed in the general direction of its movement.

10. Apparatus for the production and rapid cooling of cement clinker comprising the combination of a rotary kiln, a refractory-lined hood closing and sealing the discharge end of the kiln, the hood being provided with an opening communicating with a bustle to direct preheated air through the opening, a fuel pipe extending into the bustle to inject a fuel stream surrounded by the preheated air into the kiln, a cooling chamber below and communicating with the kiln to receive clinker particles discharging continuously therefrom, cooling elements in the chamber to support an inclined bed of clinker particles comprising a series of over-lapping, slightly vertically spaced grates, fixed grates alternating with movable grates, means to impart reciprocating movement to the movable grates to agitate the bed and move it intermittently and regularly through the chamber, and means to admit air under pressure to the chamber below the grates to provide air blasts directed through the spaces between the grates and into the bed in the general direction of its movement, the air passing through the bed, the chamber being provided with an air passage above the grates and communicating with the bustle.

11. Apparatus for the production and rapid cooling of cement clinker comprising the combination of a rotary kiln, a refractory-lined hood closing and sealing the discharge end of the kiln, the hood being provided with an opening communicating with a bustle to direct preheated air through the opening, a fuel pipe extending into the bustle to inject a fuel stream surrounded by the preheated air into the kiln, a cooling chamber below and communicating with the kiln to receive clinker particles discharging continuously therefrom, cooling elements in the chamber to support an inclined bed of clinker particles comprising a series of overlapping, slightly vertically spaced grates, fixed grates alternating with movable grates, means to impart reciprocating movement to the movable grates to agitate the bed and move it intermittently and regularly through the chamber, and means to admit air under pressure to the chamber below the grates to provide air blasts directed through the spaces between the grates and into the bed in the general direction of its movement, the air passing through the bed, the bustle being provided with an open bottom registering with an air passage opening freely into the chamber above the grates.

12. Apparatus for the production and rapid cooling of cement clinker comprising the combination of a rotary kiln, a refractory-lined hood closing and sealing the discharge end of the kiln, the hood being provided with an opening communicating with a bustle to direct preheated air through the opening, a fuel pipe extending into the bustle to inject a fuel stream surrounded by the preheated air into the kiln, a cooling chamber below and communicating with the kiln to receive clinker particles discharging continuously therefrom, cooling elements in the chamber to support an inclined bed of clinker particles comprising a series of over-lapping, slightly vertically spaced grates, fixed grates alternating with movable grates, means to impart reciprocating movement to the movable grates to agitate the bed and move it intermittently and regularly through the chamber, means to admit air under pressure to the chamber below the grates to provide air blasts directed through the spaces between the grates and into the bed in the general direction of its movement, and means to control the volume of the air directed through the upper portion of the bed relatively to the volume directed through the remainder of the bed, the chamber being provided with an air passage above the grates and communicating with the bustle.

13. Apparatus for the production and rapid cooling of cement clinker comprising the combination of a rotary kiln, a refractory-lined hood closing and sealing the discharge end of the kiln, the hood being provided with an opening communicating with a bustle to direct preheated air through the opening, a fuel pipe extending into the bustle to inject a fuel stream surrounded by the preheated air into the kiln, a cooling chamber below the kiln and having an entrance and a discharge port, a chute through which clinker particles may descend to the entrance of the cooling chamber, cooling elements in the chamber to support an inclined bed of clinker particles comprising a series of over-lapping, slightly vertically spaced grates, fixed grates alternating with movable grates, means to impart reciprocating movement to the movable grates to agitate the bed and move it intermittently toward the discharge port, means to admit air under pressure to the chamber below the grates to provide air blasts directed through the spaces between the grates and into the bed in the general direction of its movement, the air passing through the bed, the chamber being provided with an air passage above the grates and communicating with the bustle, a conveyor below the chamber to transport the clinker discharged from the port, a second clinker chute beside the first for directing the clinker from the kiln to the conveyor, a gate normally closing the second chute, and a gate to close the entrance to the cooling chamber.

14. Apparatus for the production and rapid cooling of cement clinker comprising the combination of a rotary kiln, a refractory-lined hood closing and sealing the discharge end of the kiln, the hood being provided with an opening communicating with a bustle to direct preheated air through the opening, a fuel pipe extending into the bustle to inject a fuel stream surrounded by the preheated air into the kiln, a cooling chamber below the kiln and having an entrance and a discharge port, a chute through which clinker particles may descend to the entrance of the cooling chamber, cooling elements in the chamber to support an inclined bed of clinker particles comprising a series of over-lapping, slightly vertically spaced grates, fixed grates alternating with movable grates, means to impart reciprocating movement to the movable grates to agitate the bed and move it intermittently toward the discharge port, means to admit air under pressure to the chamber below the grates to provide air blasts directed through the spaces between the grates and into the bed in the general direction of its movement, the air passing through the bed, the chamber being provided with an air passage above the grates and communicating with the bustle, a tunnel below the chamber, a conveyor in the tunnel for transporting clinker discharged from the port, a second chute beside the first for directing the clinker from the kiln to the tunnel, a gate normally closing the second chute, means to admit air blasts to the second chute to chill the clinker, and a gate to close the entrance to the cooling chamber.

15. Apparatus for the production and rapid cooling of cement clinker comprising the combination of a rotary kiln, a refractory-lined hood closing and sealing the discharge end of the kiln, the hood being provided with an opening communicating with a bustle to direct preheated air through the opening, a fuel pipe extending into the bustle to inject a fuel stream surrounded by preheated air into the kiln, a cooling chamber below and communicating with the kiln to receive clinker particles discharging continuously therefrom, means to divide the chamber into primary and secondary cooling chambers, cooling elements to support an inclined bed of clinker particles extending through both chambers comprising a series of over-lapping, slightly vertically spaced grates, fixed grates alternating with movable grates, means to impart reciprocating movement to the movable grates to agitate the bed and move it intermittently and regularly through the chambers, means to admit air under pressure to the space below the grates to provide air blasts directed through the spaces between the grates and into the bed in the general direction of its movement, the air passing through the bed, an air passage from the primary cooling chamber communicating with the bustle to supply it with preheated secondary combustion air, and means for separately exhausting the air from the secondary cooling chamber.

16. Apparatus for the production and rapid cooling of cement clinker comprising the combination of a rotary kiln, a refractory-lined hood closing and sealing the discharge end of the kiln, the hood being provided with an opening communicating with a bustle to direct preheated air through the opening, a fuel pipe extending into the bustle to inject a fuel stream surrounded by preheated air into the kiln, a cooling chamber below and communicating with the kiln to receive clinker particles discharging continuously therefrom, means to divide the chamber into primary and secondary cooling chambers, cooling elements to support an inclined bed of clinker particles extending through both chambers comprising a series of over-lapping, slightly vertically spaced grates, fixed grates alternating with movable grates, means to impart reciprocating movement to the movable grates to agitate the bed and move it intermittently and regularly through the chambers, means to divide the space below the grates into compartments corresponding to said chambers, means to admit air under pressure to the compartments to provide air blasts directed through the spaces between the grates and into the bed in the general direction of its movement, the air passing through the bed, an air passage from the primary cooling chamber communicating with the bustle to supply it with pre-heated secondary combustion air, and means for separately exhausting the air from the secondary cooling chamber.

17. Apparatus for the production and rapid cooling of cement clinker comprising the combination of a rotary kiln, a refractory-lined hood closing and sealing the discharge end of the kiln, the hood being provided with an opening communicating with a bustle to direct preheated air through the opening, a fuel pipe extending into the bustle to inject a fuel stream surrounded by preheated air into the kiln, a cooling chamber below and communicating with the kiln to receive clinker particles discharging continuously therefrom, means to divide the chamber into primary and secondary cooling chambers, cooling elements to support an inclined bed of clinker particles extending through both chambers comprising a series of over-lapping, slightly vertically spaced grates, fixed grates alternating with movable grates, means to impart reciprocating movement to the movable grates to agitate the bed and move it intermittently and regularly through the chambers, means to divide the space below the grates into compartments corresponding to said chambers, means to admit air under pressure to the compartments to provide air blasts directed through the spaces between the grates and into the bed in the general direction of its movement, the air passing through the bed, an air passage from the primary cooling chamber communicating with the bustle to supply it with pre-heated secondary combustion air, a flue for separately exhausting the air from the secondary cooling chamber, and a damper in the flue to control the volume flow of air to balance the pressure between the chambers, to prevent air from flowing from one to the other.

18. In an apparatus for the rapid cooling of cement clinker, the combination of a cooling chamber having an entrance for hot clinker at one upper end and a discharge port at the lower opposite end, means to support a substantially flat bed of clinker inclining downwardly between the entrance and discharge port comprising a series of overlapping clinker supporting elements, means to move alternate supporting elements relatively to adjacent elements to agitate and force the clinker particles downwardly over said elements to cause the clinker bed to advance toward the discharge port, and means to circulate cooling air through the clinker bed.

19. In an apparatus for the rapid cooling of cement clinker, the combination of a cooling chamber having an entrance for hot clinker at one upper end and a discharge port at the lower opposite end, a series of over-lapping clinker supporting elements forming an incline between the entrance and discharge port, means to move alternate supporting elements relatively to adjacent elements to agitate and force the clinker particles downwardly over said elements to cause the particles to move toward the discharge port, and means to circulate cooling air through the clinker particles.

20. In an apparatus for the rapid cooling of cement clinker, the combination of a cooling chamber having an entrance for hot clinker at one upper end and a discharge port at the lower opposite end, means to support a substantially flat bed of clinker inclining downwardly between the entrance and discharge port comprising a series of over-lapping clinker supporting elements, fixed elements alternating with movable elements, means to move the movable elements to agitate the clinker particles and cause them to move toward the discharge port, and means to circulate cooling air through the clinker bed.

ALFRED E. DOUGLASS.